United States Patent
Du et al.

(10) Patent No.: US 8,334,908 B2
(45) Date of Patent: Dec. 18, 2012

(54) METHOD AND APPARATUS FOR HIGH DYNAMIC RANGE IMAGE MEASUREMENT

(75) Inventors: Ming-Jhe Du, Tainan (TW); Sen-Yih Chou, Taipei (TW)

(73) Assignee: Industrial Technology Research Institute, Hsin-Chu (TW)

(*) Notice: Subject to any disclaimer, the term of this patent is extended or adjusted under 35 U.S.C. 154(b) by 276 days.

(21) Appl. No.: 12/840,056

(22) Filed: Jul. 20, 2010

(65) Prior Publication Data

US 2011/0109750 A1    May 12, 2011

(30) Foreign Application Priority Data

Nov. 12, 2009  (TW) ................... 98138461 A

(51) Int. Cl.
*H04N 17/00* (2006.01)

(52) U.S. Cl. ........................ 348/187; 348/180

(58) Field of Classification Search .......... 348/187–188, 348/655–658, 180, 251–256, 241
See application file for complete search history.

(56) References Cited

U.S. PATENT DOCUMENTS 6,753,876 B2  6/2004  Brooksby et al.
7,629,998 B2 * 12/2009  Elberbaum ............... 348/187
7,948,519 B2 *  5/2011  Knoedgen et al. ......... 348/188

OTHER PUBLICATIONS

Shree K. Nayar et al., High Dynamic Range Imaging: Spatially Varying Pixel Exposures, Computer Vision and Pattern Recognition Proceedings, IEEE Conference on vol. 1, Jun. 13-15, 2000, Columbia University, New York, U.S.A.

* cited by examiner

*Primary Examiner* — Michael Lee
(74) *Attorney, Agent, or Firm* — Morris Manning & Martin LLP; Tim Tingkang Xia, Esq.

(57) ABSTRACT

The present invention provides a method and system for high dynamic range image measurement which is configured to control the light intensity distribution through an optical modulating switch for adjusting the intensity of the light passing therethrough so as to control the light intensity distribution of the light projecting on an object or of the object light being sensed by a photo detector for preventing the optical sensing signals of the photo detector from over-saturating. After that, the optical sensing signals are compensated according to the optical intensity distribution modulated by the optical modulating switch so as to obtain an image data with high dynamic range.

18 Claims, 12 Drawing Sheets

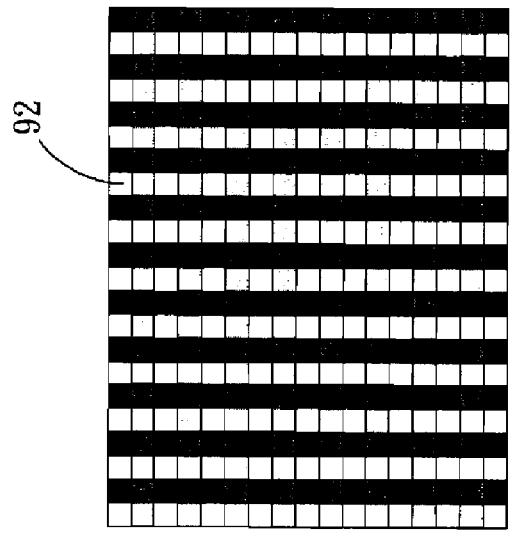
FIG. 1B
(Prior Art)
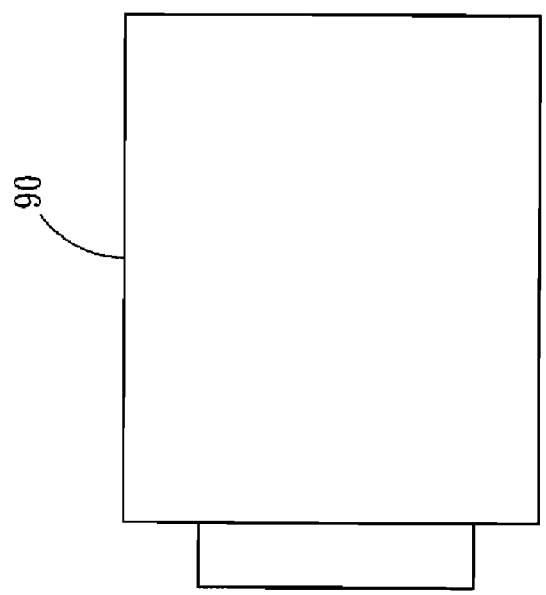
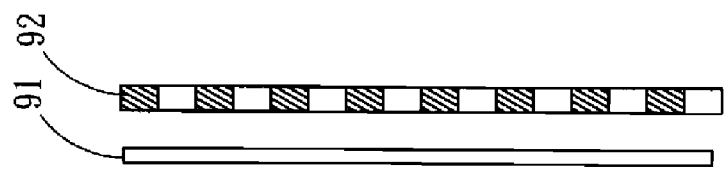
FIG. 1A
(Prior Art)

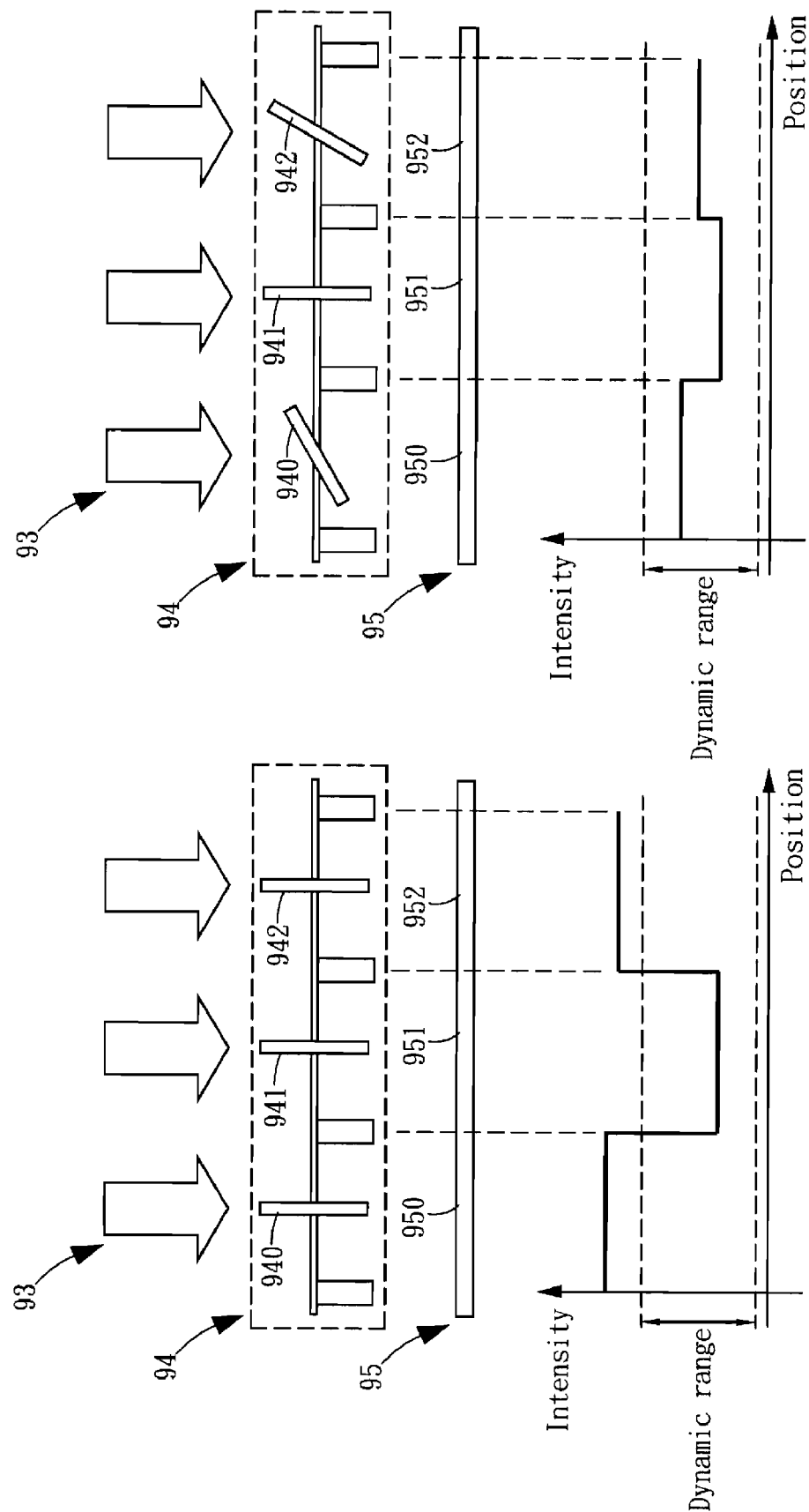

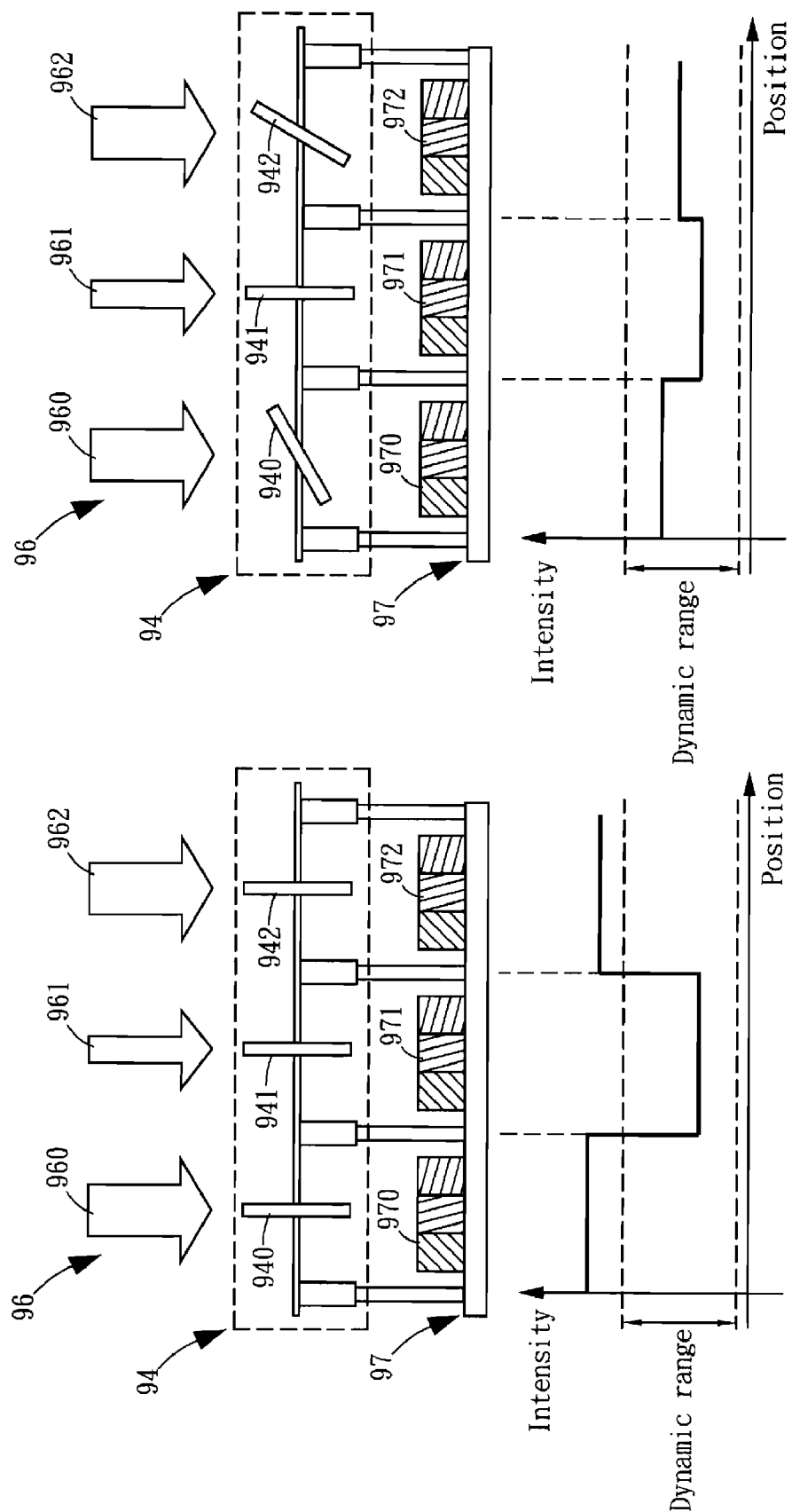

METHOD AND APPARATUS FOR HIGH DYNAMIC RANGE IMAGE MEASUREMENT

CROSS-REFERENCE TO RELATED APPLICATIONS

This non-provisional application claims priority under 35 U.S.C. §119(a) on Patent Application No(s). 098138461 filed in Taiwan, R.O.C. on Nov. 12, 2009, the entire contents of which are hereby incorporated by reference.

TECHNICAL FIELD

The present disclosure relates to an imaging technique, and more particularly, to a method and system for high dynamic range image measurement.

TECHNICAL BACKGROUND

In many recent optical measurement systems, if a measured object's surface is not evenly formed with respect to its texture, structures or even roughness, most often that the intensities of reflected/scattered lights from different portions of the object's surface can be varying in a very wide range. In order to produce an image of the object's surface with wide range of brightness variations, a single-point photo detector with high dynamic range is required. However, when the aforesaid optical measurement system with single-point photo detector is used for performing a larger-area measurement, a precision transportation mechanism is required for controlling the single-point photo detector to move to all points of the measured area accurately. Not to mention the disadvantage that the larger the area to be measured, the longer the time it will require to complete the measurement. On the other hand, When a larger-area photo detector, such as CCD, or CMOS, is used for imaging, it is usually that any image captured by such conventional imaging device ends up being too dark in some areas and saturated in others since their dynamic range is not sufficient, and thus measurement error resulting from the images captured thereby can be caused. It is noted that there are already many method designed for overcoming the aforesaid problem of insufficient dynamic range. On of which is to sequentially capture multiple images of the same scene using different exposures, and thus the multiple images are combined into a single high dynamic range image according to a specific algorithm of complementary. Another method is by placing an optical mask adjacent to the conventional imaging devices for giving the adjacent pixels on the imaging devices different exposures to the scene, and then the method performs an image reconstruction process of interpolation so as to achieve high dynamic range image.

Moreover, there is another related research disclosed in "High Dynamic Range Imaging Spatially Varying Pixel Exposures", Computer Vision and Pattern Recognition, Proceedings. IEEE Conference on Volume 1, 13-15 Jun. 2000, by Shree K. Nayar and Tomoo Mitsunaga. Please refer to FIG. 1A and FIG. 1B, which are schematic diagrams showing a conventional imaging system with spatially varying pixel exposures and an optical mask used in the imaging system. As shown in FIG. 1A and FIG. 1B, the aforesaid disclosure is featured by introducing an optical mask with a pattern of spatially varying transmittances 92 into the imaging system at a position between its imaging device 90, e.g. a CCD, and an object to be measured 91. Considering the array of pixels shown in FIG. 1B, the brightness level associated with each pixel represents its sensitivity, such that, the brighter pixels have greater exposure to image irradiance and the darker ones have lower exposure. Noted that when a pixel is saturated in the acquired image, it is likely to have a neighbor that is not. Thereby, a high dynamic range image can be computed according to a specific algorithm for combining four neighboring pixels of different exposures into one larger single pixel including the four neighboring pixels, however, at a cost of lower spatial resolution.

TECHNICAL SUMMARY

In one embodiment, the present disclosure provides a method for high dynamic range image measurement, comprising the steps of: forming a safe light intensity distribution configured to enable a surface irradiance signal representing the surface brightness of an object to be ranged within the dynamic range of an imaging device for capturing images of the object; using the imaging device to sense the surface irradiance signal so as to form an image signal; and compensating the image signal according to the safe light intensity distribution so as to form a reconstructed image signal with light intensities of actual surface irradiances relating to the object.

In another embodiment, the present disclosure provides a system for high dynamic range image measurement, comprising: a light source, for providing a detection light to be projected onto a object so as to form an object light; an imaging device, for receiving the object light to be used for forming an image signal; a light modulation switch, disposed between the light source and the object to be used for modulating the detection light so as to enable the same to be featured by a safe light intensity distribution and thus enable light intensities resulting from the object light that are detected by the imaging device to be ranged within the dynamic range of the imaging device; and a control unit, coupled to the light modulation switch and the imaging device, for controlling the light modulation switch to modulate the detection light and also for compensating the image signal according to the safe light intensity distribution so as to form a reconstructed image signal with actual light intensities.

Moreover, in an embodiment, the present disclosure provides a system for high dynamic range image measurement, comprising: a light source, for providing a detection light to be projected onto a object so as to form an object light; an imaging device, for receiving the object light to be used for forming an image signal; a light modulation switch, disposed between the object and the imaging device to be used for modulating the detection light so as to enable the same to be featured by a safe light intensity distribution and thus enable light intensities resulting from the object light that are detected by the imaging device to be ranged within the dynamic range of the imaging device; and a control unit, coupled to the light modulation switch and the imaging device, for controlling the light modulation switch to modulate the detection light and also for compensating the image signal according to the safe light intensity distribution so as to form a reconstructed image signal with actual light intensities.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1A and FIG. 1B are schematic diagrams showing a conventional imaging system with spatially varying pixel exposures and an optical mask used in the imaging system.

FIG. 4A and FIG. 4B are schematic diagrams showing a light modulation switch of different configurations as it is being disposed in front of a light source according to an embodiment of the present disclosure.

FIG. 5A and FIG. 5B are schematic diagrams showing a light modulation switch of different configurations as it is being disposed in front of an imaging device according to another embodiment of the present disclosure.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

The present disclosure provides a technique for a low dynamic range imaging device, such as a CCD or CMOS, to acquire a high dynamic range image in one-shot. Thereby, it is possible to measure a very wide range of scene radiances and produce a substantially larger number of brightness levels by any conventional low dynamic range imaging system, without any reduction in spatial resolution and subtle contrast variation. The availability of extra bits of data at each image pixel is expected to enhance the robustness of vision algorithms so that an accurate surface topography of a measured object can be obtained.

Moreover, there is a light modulation switch provided in the present disclosure, which is configured in the light source module for controlling the regional illumination of the object in a pointwise manner. The light modulation switch can be a digital micromirror device (DMD), or a liquid crystal on silicon (LCOS) chip, whichever is configured to control the light intensity distribution relating to the illumination of a sample in a manner that the shiny regions of the sample are illuminated with lower light intensity and the dull regions thereof are illuminated with higher light intensity so as to produce a raw image with the surface brightness levels of all its pixels to be ranged within the dynamic range of an imaging device like a CCD. Thereafter, the single raw image is processed by a compensation operation according to a intensity gain ratio of the light intensity before and after being modulated by the use of the DMD/LCOS, so that a high dynamic range image can be obtained from the use of any low dynamic range imagine device, such as CCD. Since the aforesaid technique provided in the present disclosure only require its imaging device to capture one image for processing, not only it's much economic in time and will not introduce errors of multiple sampling, but also it will not cause any reduction in spatial resolution.

Figure 2:
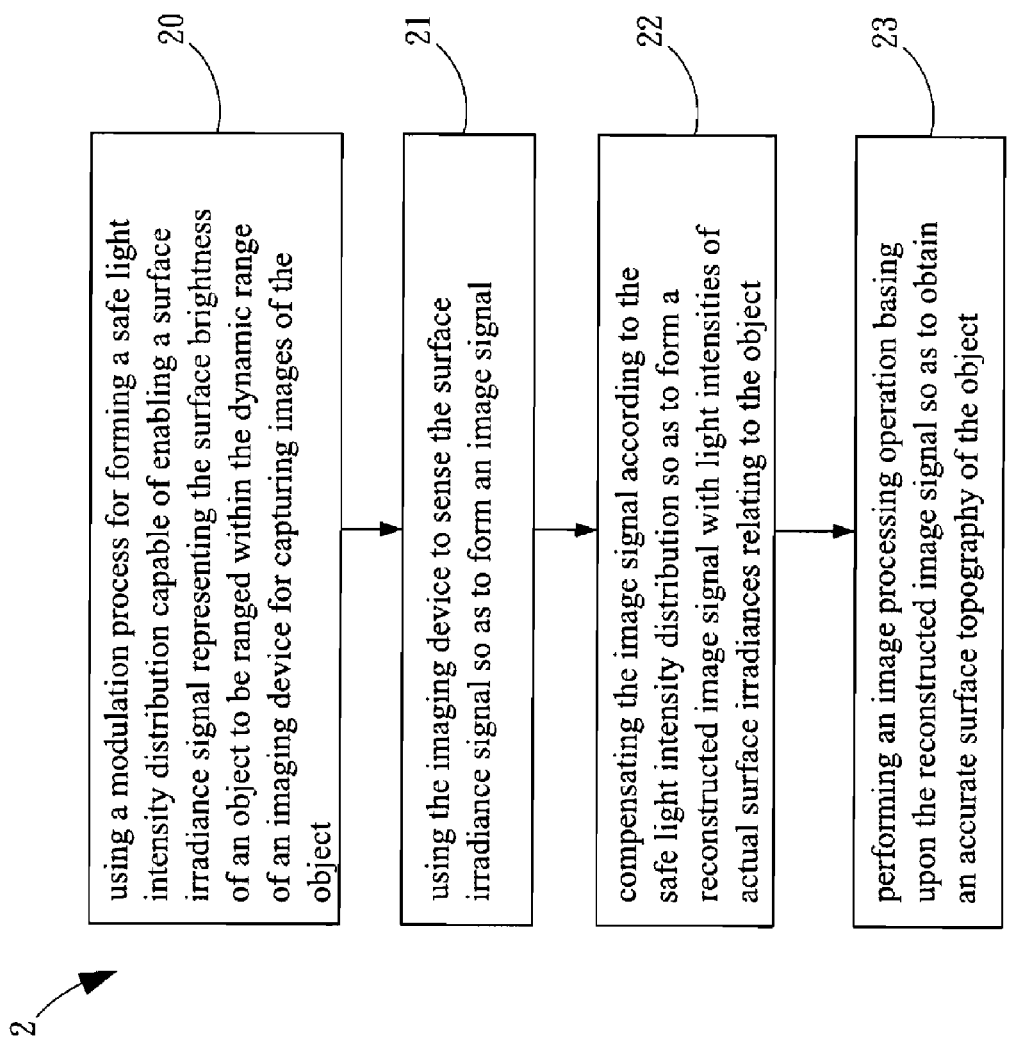
FIG. 2 is a flow chart depicting steps of a method for high dynamic range image measurement according to an embodiment of the present disclosure.

Please refer to FIG. 2, which is a flow chart depicting steps of a method for high dynamic range image measurement according to an embodiment of the present disclosure. The flow starts from step 20. At step 20, a process is performed for forming a safe light intensity distribution configured to enable a surface irradiance signal representing the surface brightness of an object to be ranged within the dynamic range of an imaging device for capturing images of the object; and then the flow proceeds to step 21. Since surfaces of many objects can include regions which are shiny or dull, or otherwise have poor reflectivity characteristics, light projected onto these surfaces can result in a high range of dynamic light intensity levels, i.e. dull spots and overly bright spots which may cause images captured by a conventional imaging device to end up being too dark in some areas and possibly saturated in others. Therefore, subtle contrast variations in those areas are not detectable in the captured images so that the surfaced topography using the image is not accurate. Thus, the operation of the step 20 is to enable brightness levels of an object light reflected from all points in the object's surface to be ranged within the dynamic range of an imaging device, such as a CCD or CMOS, so that all the subtle details of the object are detectable in the image.

Moreover, the modulation process performed in the step 20 uses an intensity control switch for modulating the light intensity distribution of the light emitted from a light source so as to form a safe light intensity distribution configured to enable the surface irradiance of the object to be ranged within the dynamic range of the imaging device. It is noted that the intensity control switch can be a DMD or a LCOS chip, but is not limited thereby, and it is a device composed of a plurality of switch elements for spatially varying the transmittance and incident angle of the object light with respect to different regions of the object so as to control the light intensity distribution of the light source on the surface of the object. As for the control of each switch element with respect to transmittance and incident angle, it is regulated for forming a safe light intensity distribution configured to enable the surface brightness levels of the object to be ranged within the dynamic range of the imaging device, i.e. there will be no dull spot and overly bright spot. In another embodiment, the modulation process performed in the step 20 uses an intensity control switch for modulating the light intensity distribution of an object light resulting from the reflection of the object's surface, after being illuminated by the light emitted from a light source, so as to form similarly a safe light intensity distribution configured to enable the surface irradiance of the object to be ranged within the dynamic range of the imaging device.

Figure 3A:
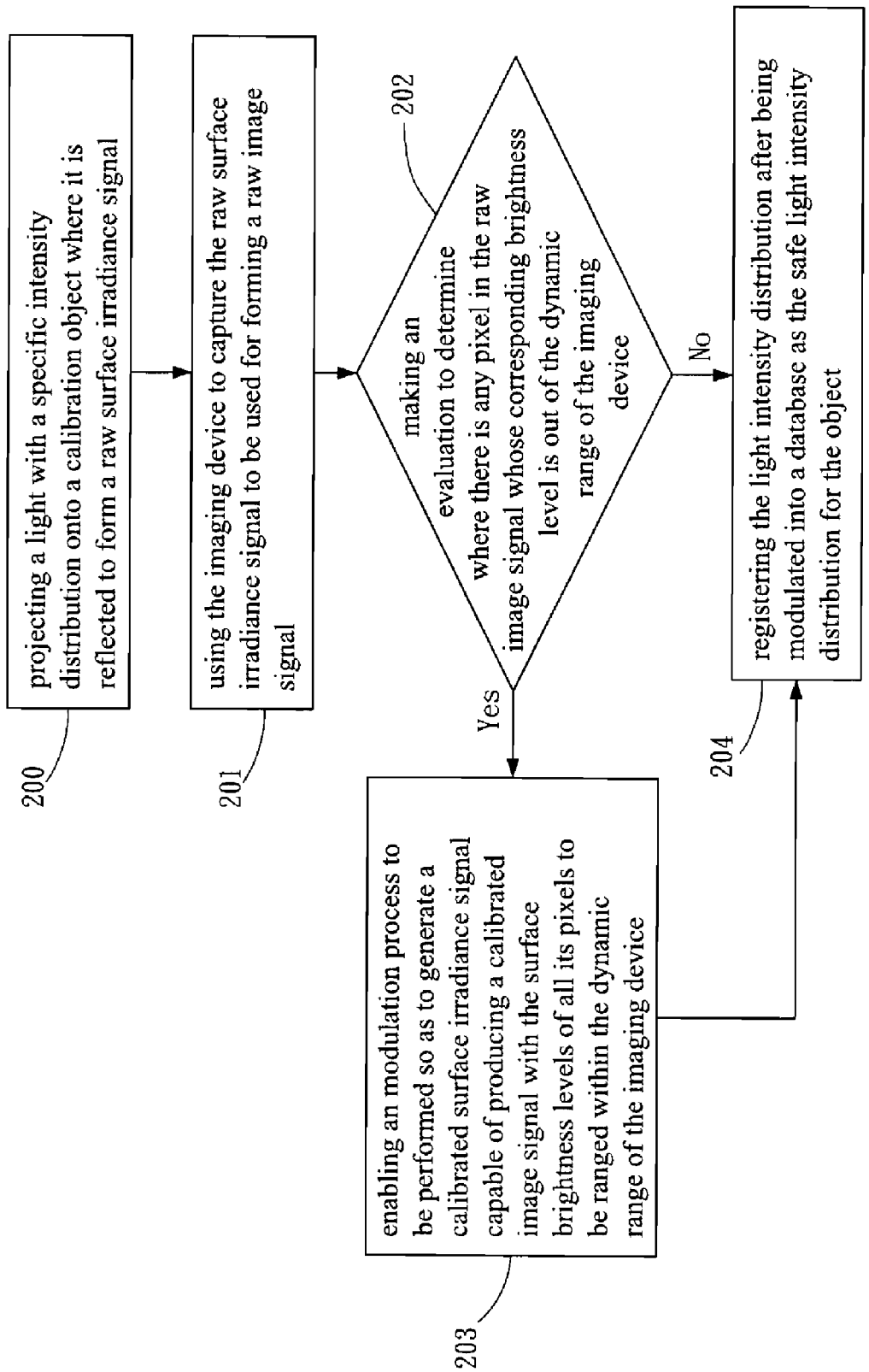
FIG. 3A is a flow chart depicting steps for forming a safe light intensity distribution according to an embodiment of the present disclosure.

Please refer to FIG. 3A, which is a flow chart depicting steps for forming a safe light intensity distribution according to an embodiment of the present disclosure. The flow starts from step 200. At step 200, a light with a specific intensity distribution is projected onto a calibration object where it is reflected to form a raw surface irradiance signal; and then the flow proceeds to step 201. At step 201, an imaging device is used to capture the raw surface irradiance signal so as to form a raw image signal; and then the flow proceeds to step 202. At step 202, an evaluation is made for determining where there is any pixel in the raw image signal whose corresponding brightness level is out of the dynamic range of the imaging device; if so, the flow proceeds to step 203; otherwise, the flow proceeds to step 204. Since the light intensity of the object light resulting from the reflection of the object's surface can be varying in a wide range according to the texture, structure and roughness of the object's surface, some pixels of the imaging device corresponding to those dull spots can appear black and some pixels of the imaging device corresponding to those overly bright spots can be over saturated. Thus, if the evaluation performed in step 202 detects the condition of black areas or over saturated, the flow will proceed to step 203 for enabling an modulation process to be performed so as to generate a calibrated surface irradiance signal configured to produce a calibrated image signal with the surface brightness levels of all its pixels to be ranged within the dynamic range of the imaging device. In the step 203, the modulation process is performed by the use of an intensity control switch for directly controlling the light intensity distribution of the light emitted from a light source as it is disposed in front of the light source. On the other hand, the intensity control switch can be disposed at another position in front of the imaging device so that it can control the light intensity distribution of the object light resulting from the reflection of the object's surface. However, no matter the intensity control switch is being arranged in front of the light source or in front of the imaging device, it is designed to control the transmittance and incident angles of those switch elements embedded therein whichever are located at positions corresponding to the over exposure pixels and the under exposure pixels of the imaging device for enabling the surface brightness levels of all its pixels to be ranged within the dynamic range of the imaging device.

Please refer to FIG. 4A and FIG. 4B, which are schematic diagrams showing a light modulation switch of different configurations as it is being disposed in front of a light source according to an embodiment of the present disclosure. It is noted that the light modulation switch shown in FIG. 4A and FIG. 4B can be a DMD or a LCOS, but in the present embodiment, the light transmittance is only illustrated by the angular variations of the switch elements, but in actual condition, it is dependent upon the reflection characteristics or the transmission characteristics of the DMD or LCOS. As shown in FIG. 4A, when a uniformly distributed detection light 93 is projected onto an object 95 through a light modulation switch 94 composed of three switch elements 940~942, the irradiance signals corresponding to the surface regions 950 and 952 of the object 95 that are resulting directly from the illumination of the detection light 93 are exceeding the dynamic range of the imaging device, as it is indicated in the corresponding profile of intensity distribution of FIG. 4A. Therefore, by adjusting the configurations of the switch elements 940 and 942 as those shown in FIG. 4B, the amount of light being projected on the corresponding areas 950 and 952 are reduced so that the corresponding irradiance signals are decreased for allowing the same fall in the dynamic range of the imaging device.

Please refer to FIG. 5A and FIG. 5B, which are schematic diagrams showing a light modulation switch of different configurations as it is being disposed in front of an imaging device according to an embodiment of the present disclosure. It is noted that the light modulation switch shown in FIG. 5A and FIG. 5B can similarly be a DMD or a LCOS, and in the present embodiment, the light transmittance is also only illustrated by the angular variations of the switch elements, but in actual condition, it is dependent upon the reflection characteristics or the transmission characteristics of the DMD or LCOS. As shown in FIG. 5A, as soon as an object light 96 is projected uniformly onto an imaging device 97 through a light modulation switch 94 composed of three switch elements 940~942 whereas the three switch elements 940~940 are located at positions corresponding to the three pixels 970~972 of the imaging device 97, the irradiance signals resulting from the object light 96 that are detected by the pixels 970 and 972 of the imaging device 97 are exceeding the dynamic range of the imaging device 97, as it is indicated in the corresponding profile of intensity distribution of FIG. 5A. Therefore, by adjusting the configurations of the switch elements 940 and 942 as those shown in FIG. 5B, the amount of the object 96 light being projected on the corresponding pixels 970 and 972 are reduced so that the corresponding irradiance signals are decreased for allowing the same fall in the dynamic range of the imaging device 97.

According to the foregoing descriptions relating to FIG. 4A, FIG. 4B, FIG. 5A and FIG. 5B, when the dark spots on the captured image are resulting from the under-exposed pixels illuminated by object light of low light intensity, the switch elements in the light modulation switch that are located at positions corresponding to those under-exposed pixels will be adjusted for allowing more such object light to pass therethrough and thus increasing the object light being projected onto those under-exposed pixels, e.g. increasing the light intensity by two folds, so that the brightness levels of those previous dark spots can be increased and thus ranged within the dynamic range of the imaging device. On the other hand, when the overly bright spots on the captured image are resulting from the over-exposed pixels illuminated by object light of high light intensity, the switch elements in the light modulation switch that are located at positions corresponding to those over-exposed pixels will be adjusted for allowing less object light to pass therethrough and thus decreasing the object light being projected onto those over-exposed pixels, e.g. decreasing the light intensity by one half, so that the brightness levels of those previous bright spots can be decreased and thus ranged within the dynamic range of the imaging device. It is noted that the increasing or decreasing of the light intensity is not limited by the aforesaid two folds or one half, it can be determined at will according to actual requirement.

Figure 3B:
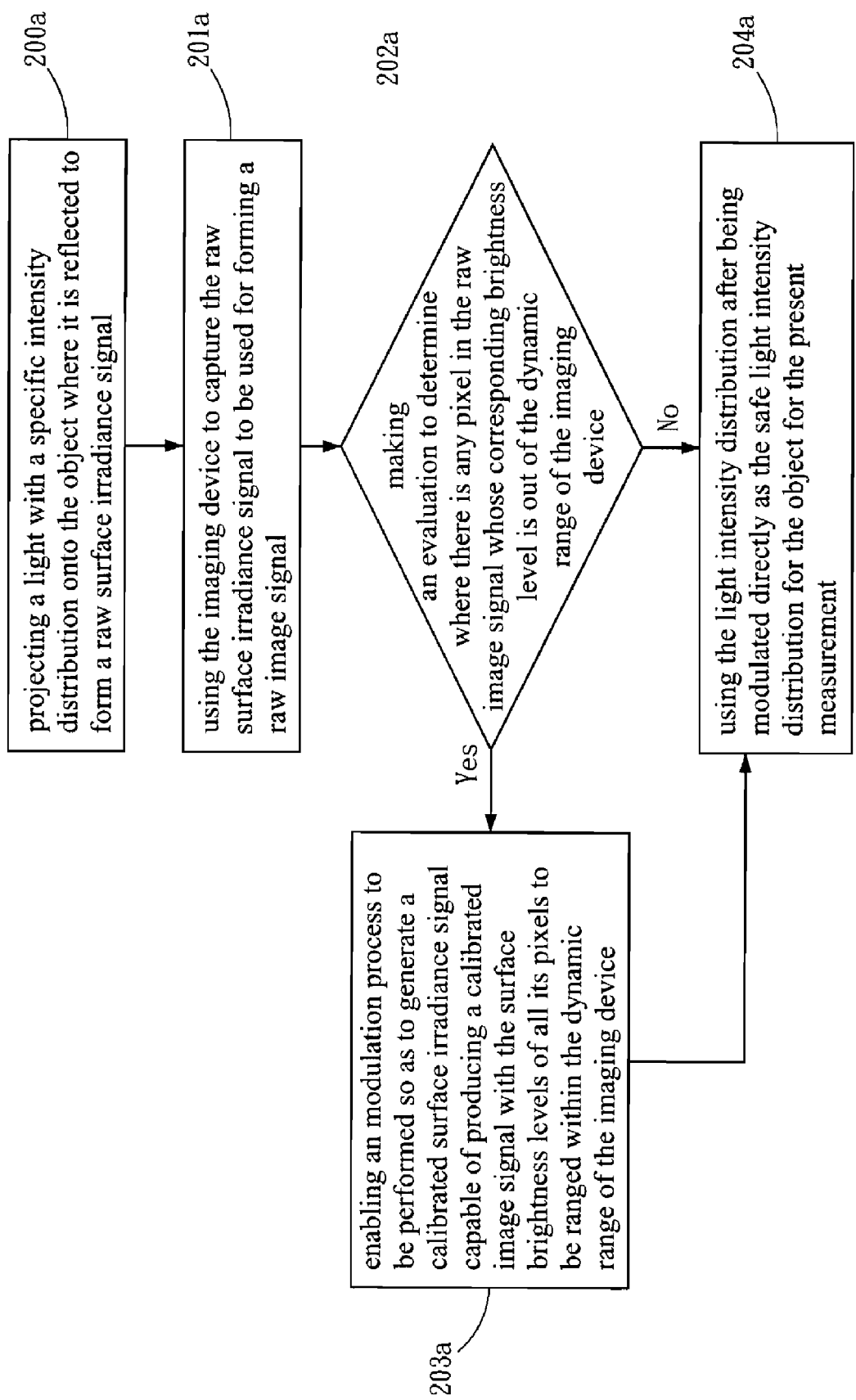
FIG. 3B is a flow chart depicting steps for forming a safe light intensity distribution according to another embodiment of the present disclosure.

Finally at step 204 shown in FIG. 3A, the light intensity distribution configured to enable surface brightness levels of all pixels to be ranged within the dynamic range is registered and used as the safe light intensity distribution. It is noted that the registration operation in the step 204 is primarily performed by recording the configurations of the switch elements in the light modulation switch into a memory unit at the moment when the surface brightness levels of all points in the captured image are ranged within the dynamic range of the imaging device. By aforesaid process from step 201 to step 203, a schedule of safe light intensity distributions with respect to a variety of objects can be measured and planned so as to accomplish a database of safe light intensity distributions for those different objects, by that any measurement of those objects can be performed efficiently and accurately. The process illustrated in FIG. 3A is provided for constructing the database of safe light intensity distributions, and thereby, as soon as a specific object is selected to be measured, the corresponding safe light intensity distribution can be retrieved from the database to be used for configuring the switch elements in the light modulation switch. However, in another embodiment of the present disclosure, the safe light intensity distribution for the object can be achieved and determined in a real-time manner by using an on-line adjusting of the switch elements in the light modulation switch. Please refer to FIG. 3B, is a flow chart depicting steps for forming a safe light intensity distribution according to another embodiment of the present disclosure. The step 200a to step 203a in FIG. 3B are the same as those in FIG. 3A while the embodiments shown in FIG. 3A and FIG. 3B are differ from each other in that: instead of registering the achieved light intensity distribution into a database, the light intensity distribution is used directly as the safe light intensity distribution of the object for the present measurement.

Accordingly, the safe light intensity distribution referred in the step 20 of FIG. 2 can determined by the process described in FIG. 3A or the process described in FIG. 3B. Taking the determination process shown in FIG. 3A for example, when an object is selected to be measured, a corresponding safe light intensity distribution is first being selected from the database according to the type of the object and then being provided to the light modulation switch for adjusting its switch elements according to the selected safe light intensity distribution, and thus either enabling the detection light to be projected onto the object's surface according to the safe light intensity distribution, or enabling the object light to be projected onto the imaging device according to the safe light intensity distribution. Thereafter, the step 21 is performed for enabling the imaging device to sense the surface irradiance signal so as to form an image signal. Then, the step 22 is performed for compensating the image signal according to the safe light intensity distribution so as to form a reconstructed image signal with light intensities of actual surface irradiances relating to the object.

Figure 6:
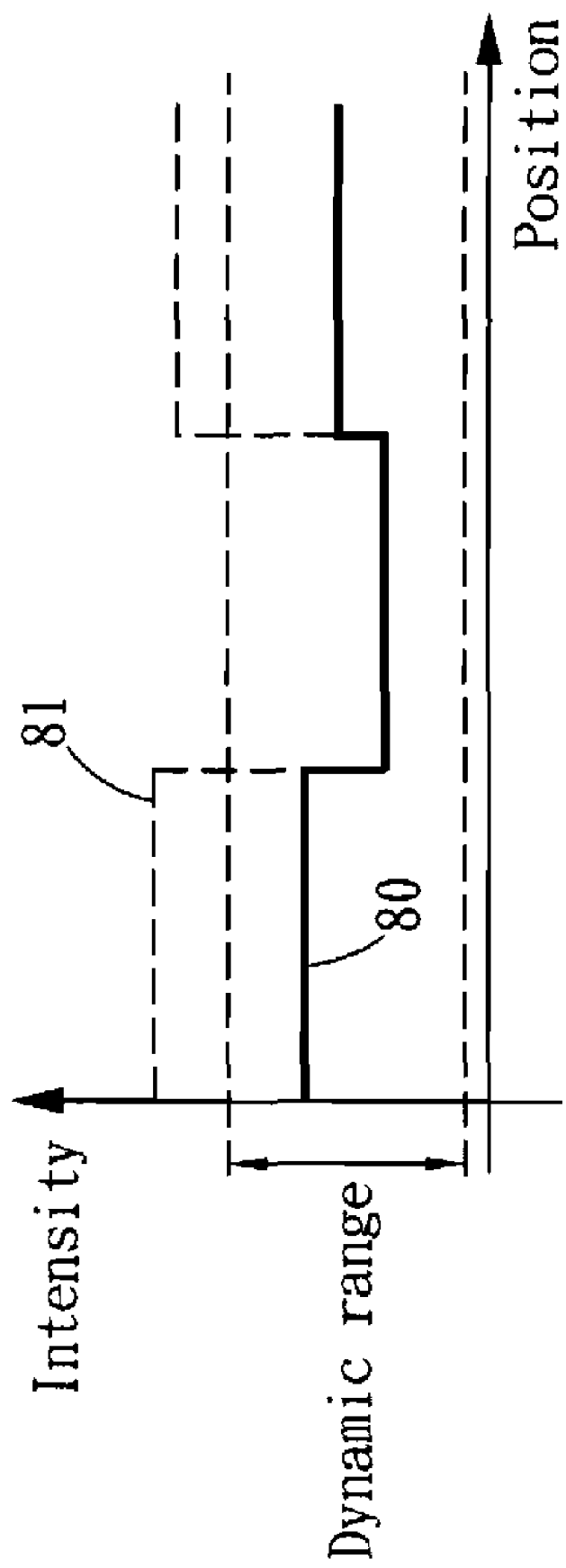
FIG. 6 is a schematic diagram depicting the light intensity compensation process performed in the present disclosure.

In step 22, the reconstruction is performed primarily upon those areas that are being calibrated by the switch elements as they are over exposed or under exposed. For instance, for those areas whose corresponding light intensities are increased by said two folds, the actual light intensities can be obtained by the use of a correction function for dividing the raw light intensities by an intensity gain ratio of the light intensity before and after being modulated, i.e. divided by 2 in this case. On the other hand, for those areas whose corresponding light intensities are decreased by said one half, the actual light intensities can be obtained by the use of a correction function for multiplying the raw light intensities by an intensity gain ratio of the light intensity before and after being modulated, i.e. multiplying by 2 in this case. Thereby, a reconstructed image signal with light intensities of actual surface irradiances can be obtained after enabling each pixel in the raw image of the imaging device to be process by the correction function with its corresponding intensity gain ratio. Please refer to FIG. 6, which is a schematic diagram depicting the light intensity compensation process performed in the present disclosure. In FIG. 6, the intensity profile 80 is resulted directly from the step 21 that are compensated in the step 23 by the correction function with corresponding intensity gain ratios so as to obtain a correct profile 81 to be used for forming a high dynamic range reconstructed image signal.

Thereafter, an image processing operation is performed basing upon the reconstructed image signal so as to obtain an accurate surface topography of the object.

Figure 7:
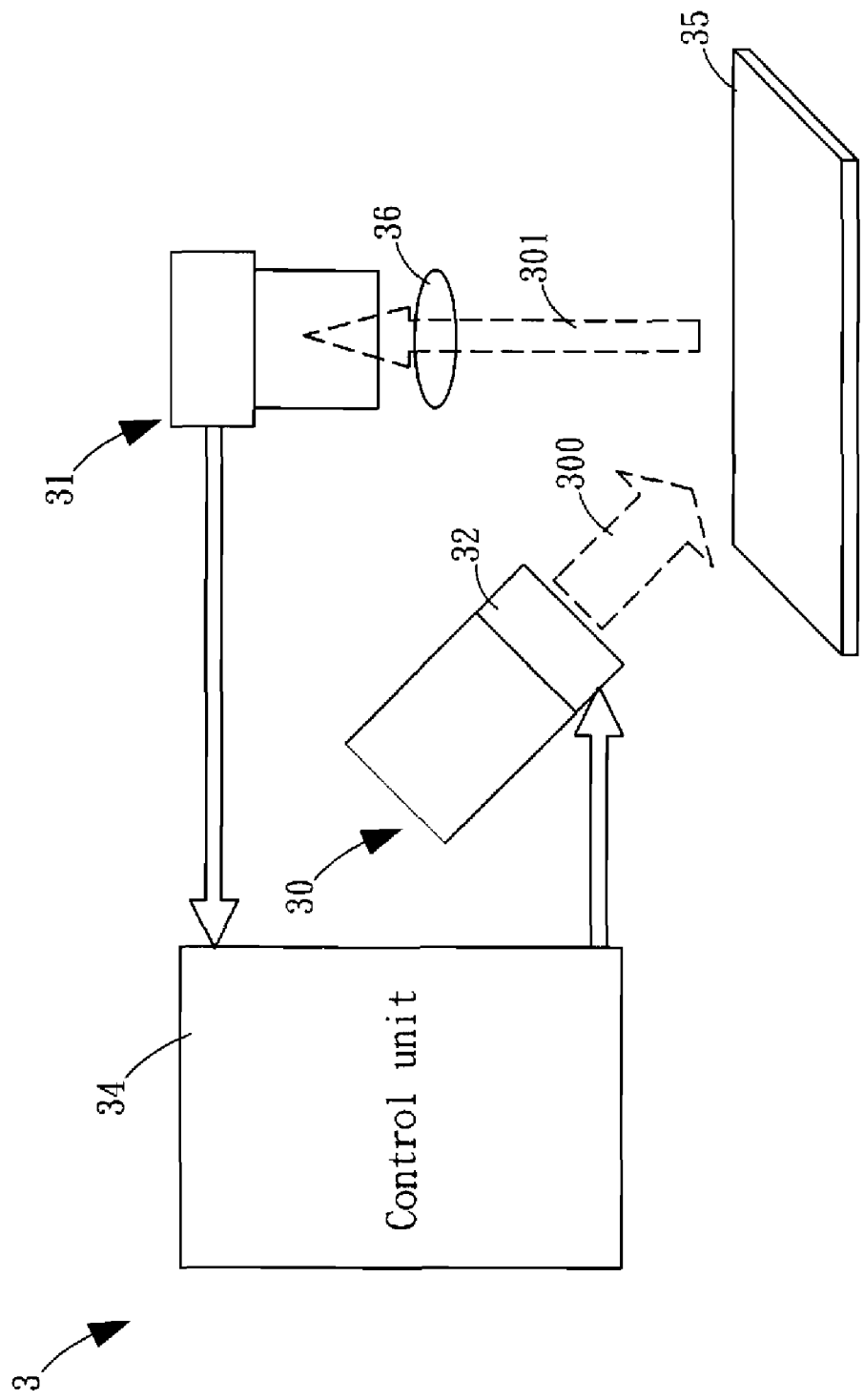
FIG. 7 is a schematic diagram showing a system for high dynamic range image measurement according to an embodiment of the present disclosure.
Figure 8A:
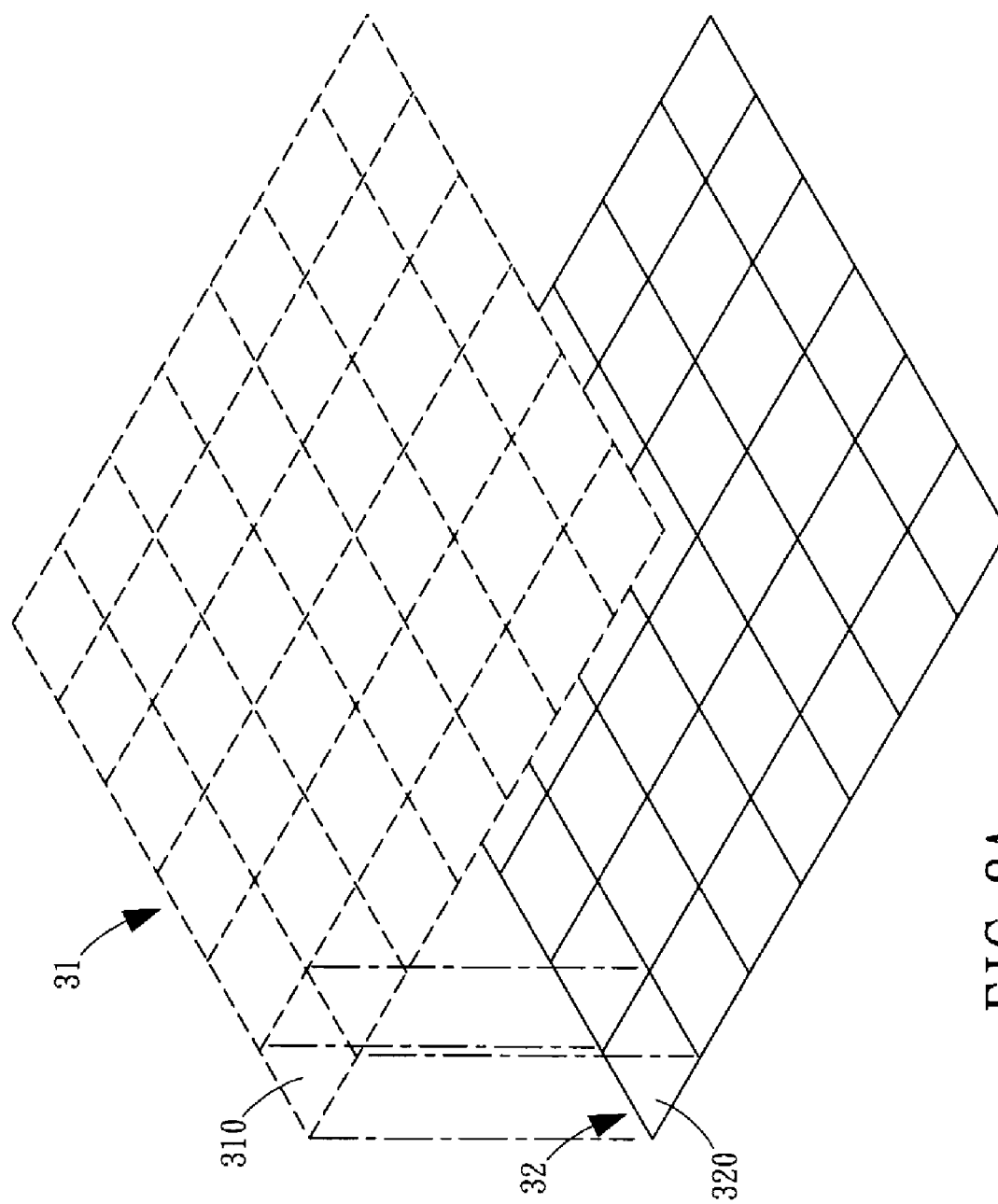
FIG. 8A and FIG. 8B are schematic diagrams showing the arranging of the pixels in an imaging device and the switch elements in a light modulation switch in an one-to-one manner and in a one-to-many manner.
Figure 8B:
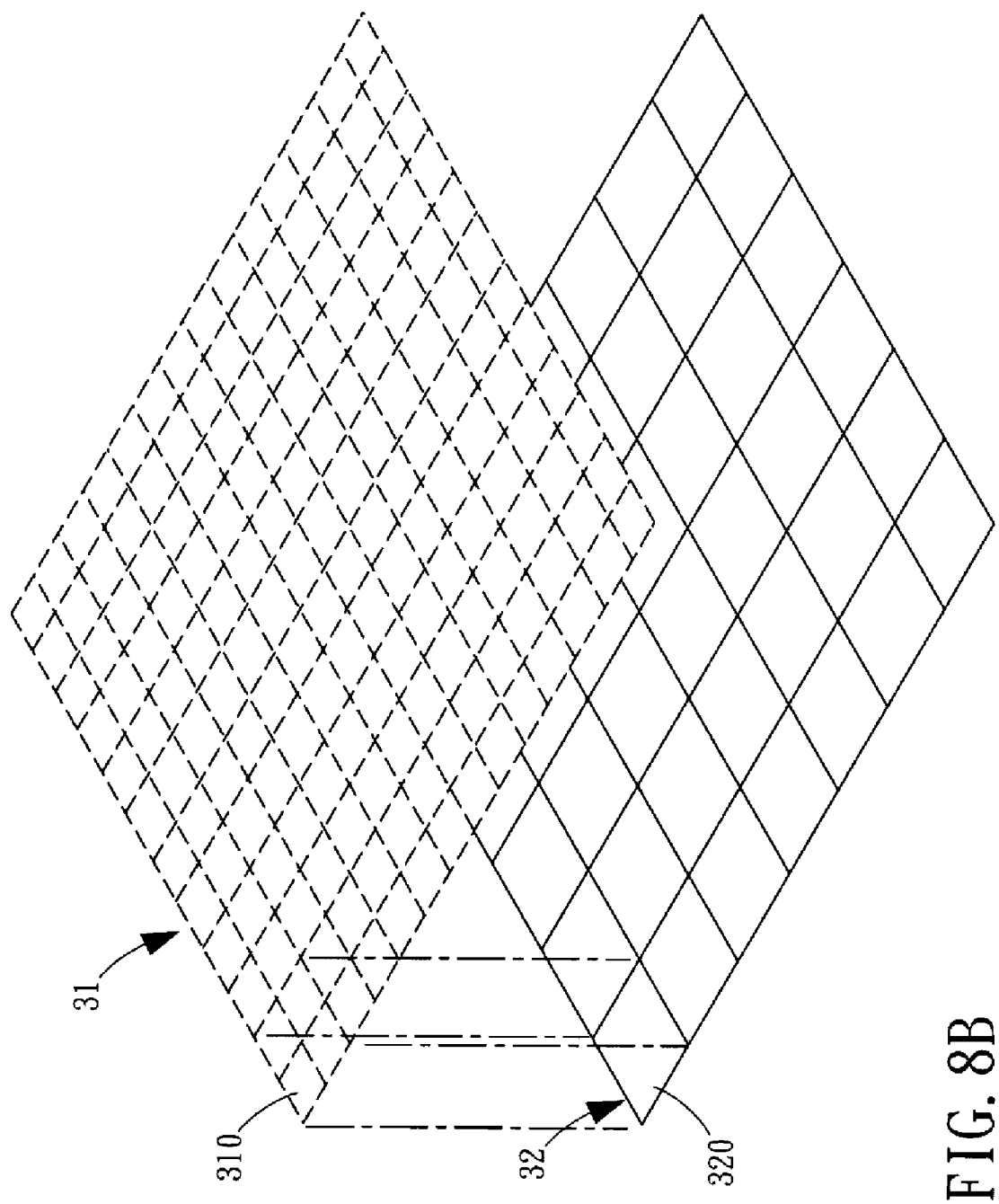

Please refer to FIG. 7, which is a schematic diagram showing a system for high dynamic range image measurement according to an embodiment of the present disclosure. In this embodiment, the system for high dynamic range image measurement 3 comprises: a light source 30, an imaging device 31, a light modulation switch 32 and a control unit 34. The light source 31 is used for providing a detection light 300 to be projected onto an object 35 so as to form an object light 301. The imaging device 32 is used for receiving the object light 301 to be used for forming an image signal, which can be a CCD or a CMOS in this embodiment. Moreover, there is a lens set 36 arranged at a position between the imaging device 31 and the object 35 for focusing the object light 301 onto the imaging device 31. The light modulation switch 32 is used for modulating the detection light 300 so as to enable the same to be featured by a safe light intensity distribution and thus enable light intensities resulting from the object light that are detected by the imaging device 31 to be ranged within the dynamic range of the imaging device 31. In this embodiment, the light modulation switch 32 is a switch device configured for controlling the regional illumination of the object 35 in a pointwise manner, which can be a DMD or a LCOS, but is not limited thereby. Please refer to FIG. 8A and FIG. 8B, which are schematic diagrams showing the arranging of the pixels in an imaging device and the switch elements in a light modulation switch in an one-to-one manner and in a one-to-many manner. As shown in FIG. 8A, the light modulation switch 32 is further comprised of a plurality of switch elements 320; and if a DMD is used as the light modulation switch 32, the amount of object light being permitted to travel passing through is controlled by the angular orientations of the plural switch elements 320; however, if the light modulation switch 32 is a LCOS, the amount of object light being permitted to travel passing through is controlled by the adjustment of the twisting angles of the plural switch elements 320. Moreover, in FIG. 8A, each of the switch elements 320 maintains a one-to-one relationship with the pixels 310 in the imaging device 31, however, in FIG. 8B, each of the switch elements 320 maintains a one-to-many relationship with the pixels 310 in the imaging device 31. It is known to those skilled in the art that there can be a variety of light modulation switches 32 available for the measurement system of the present disclosure that can be selected according to actual requirement.

Figure 9:
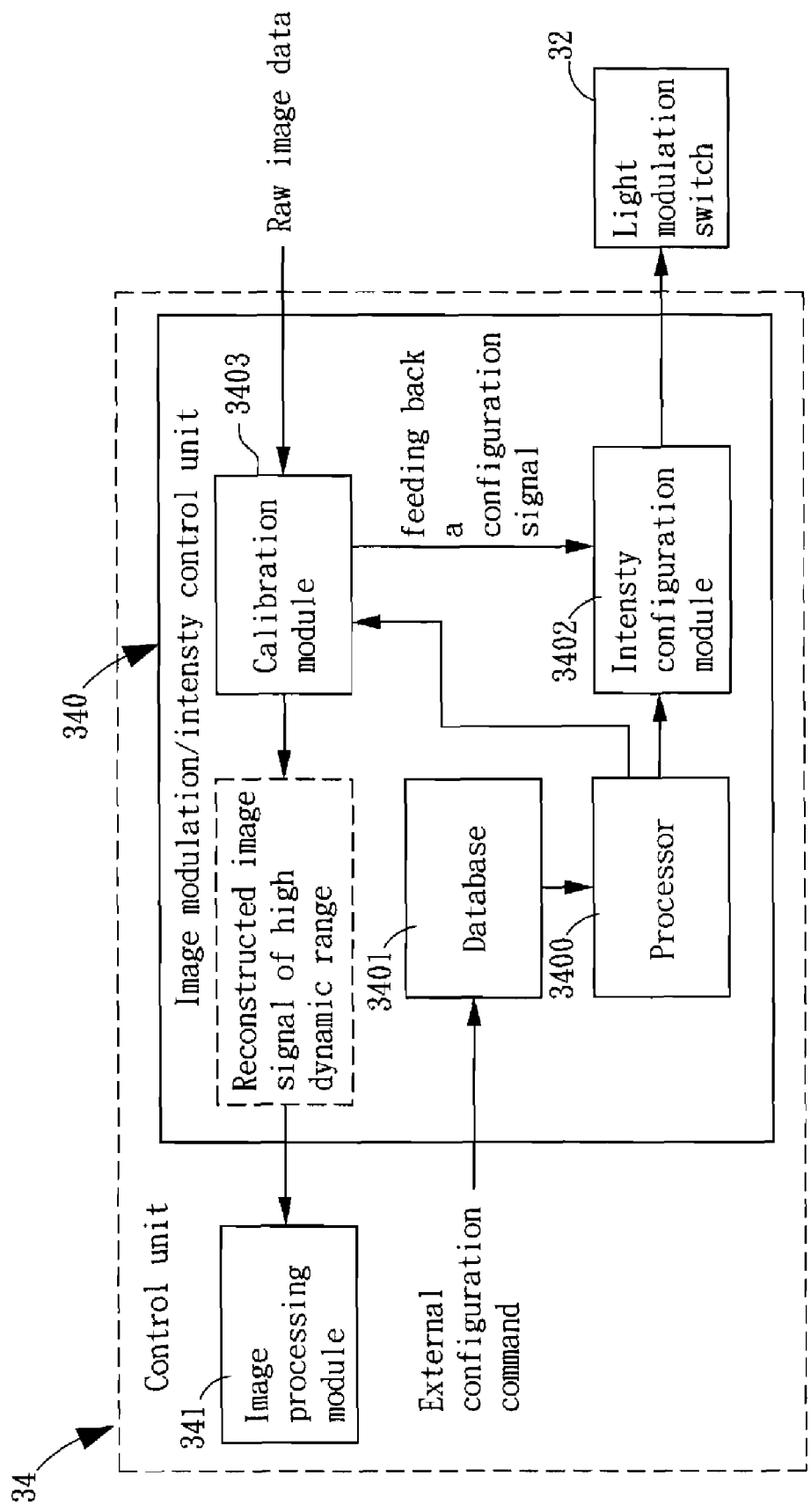
FIG. 9 is a block diagram of a control unit used in the present disclosure.

The control unit 34, being coupled to the light modulation switch 32 and the imaging device 32, is further comprised of: an image modulation/intensity control unit 340 and an imaging processing module 341, as shown in FIG. 9. Moreover, the image modulation/intensity control unit 340 further comprises: a processor 3400, a database 3401, an intensity configuration module 3402 and a calibration module 3403. It is noted that the database 3401 is used for registering a plurality of light modulation configurations corresponding to a plurality of safe light intensity distributions associated with a variety of objects. That is, the safe light intensity distributions produced from the process of FIG. 3A are directed to be stored in the database 3401 by external configuration commands. In this embodiment, the database 3401 is integrated inside the image modulation/intensity control unit 340, but it is not limited thereby. In another embodiment, the database 3401 can be arranged detaching from the image modulation/intensity control unit 340 so that the image modulation/intensity control unit 340 should be designed to access information from the database 3401 through the interfacing of a bus.

The intensity configuration module 3402 is used for controlling the light modulation switch 32 to modulate the light intensity distribution of the detection light according to commands from the processor 3400. Since the light intensity of the object light resulting from the reflection of the object's surface can be varying in a wide range according to the texture, structure and roughness of the object's surface, some pixels of the conventional imaging device corresponding to those dull spots can appear black and some pixels of the imaging device corresponding to those overly bright spots can be over saturated as the dynamic range of the conventional imaging device is narrower. Therefore, subtle contrast variations in those areas are not detectable in the captured images, or even will introduce errors into the captured image for causing imaging degradation, so that the surfaced topography using the image is not accurate. Accordingly, the control unit 34 is provided for generating a control signal to control the modulation of the light modulation switch 32 so as to enable the modulated detection light to be featured by a safe light intensity distribution and thus enable light intensities resulting from the object light that are detected by the imaging device to be ranged within the dynamic range of the imaging device. After the imaging device captures an image of the object, the calibration module 3403 in the control unit 34 is enabled to perform the step 22 of FIG. 2 for compensating the image signal according to the safe light intensity distribution so as to form a reconstructed image signal with light intensities of actual surface irradiances relating to the object. In addition, the image processing module 341 in the control unit 34 is used for receiving the reconstructed image signal from the calibration module 3403 to be used in the step 23 of FIG. 2 for reconstructing the surface topography of the object accordingly.

Figure 10:
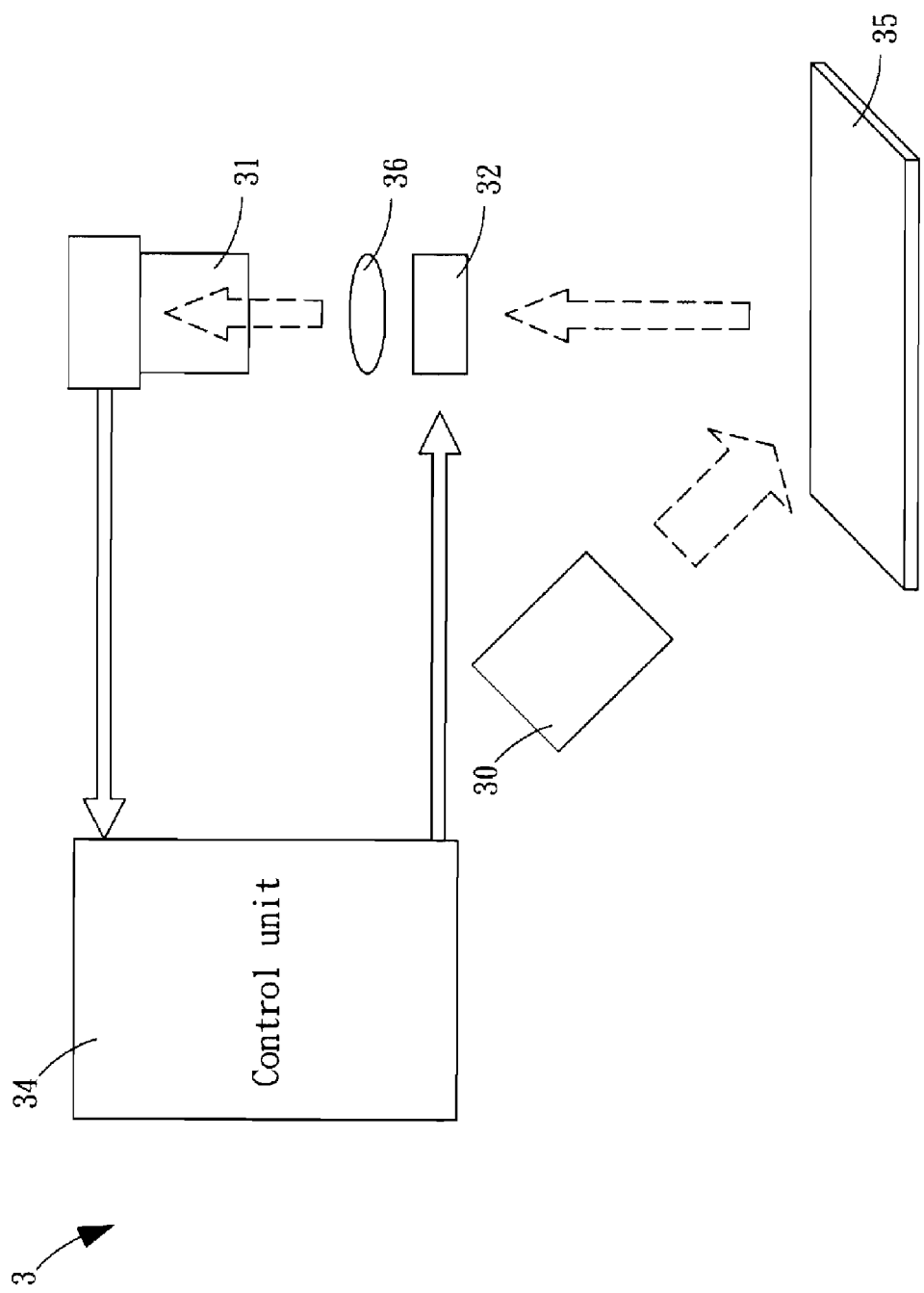
FIG. 10 is a schematic diagram showing a system for high dynamic range image measurement according to another embodiment of the present disclosure.

Please refer to FIG. 10, which is a schematic diagram showing a system for high dynamic range image measurement according to another embodiment of the present disclosure. In this embodiment, the measurement system 3 is structured similar to the one disclosed in the embodiment of FIG. 4, but is different in that: the light modulation switch 32 is disposed in front of the imaging device 31 instead of in front of the object, by that the light intensities allowed to be detected by the pixels in the imaging device 31 are controlled thereby in a manner that all the light intensities resulting from the object light that are detected by the imaging device 31 are ranged within the dynamic range of the imaging device 31. In this embodiment, the light modulation switch 32 can be integrated with the imaging device 31 into a unitary device, or can be two separate devices. Moreover, when the light modulation switch 32 is not integrated with the imaging device 31, the light modulation switch 32 can be disposed at a position between the imaging device 31 or a lens set 36, or at a position between the lens set 36 and the object 35. Thereafter, the control unit 34 is enabled to compensate the image captured by the imaging device 31 according to the modulation of the light modulation switch so as to form a high dynamic range image with actual light intensities to be provided for reconstructing the surface topography of the object with high accuracy.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for high dynamic range image measurement, comprising the steps of:
    forming a safe light intensity distribution configured to enable a surface irradiance signal representing the surface brightness levels of an object to be ranged within the dynamic range of an imaging device for capturing images of the object;
    using the imaging device to sense the surface irradiance signal so as to form an image signal;
    compensating the image signal according to the safe light intensity distribution so as to form a reconstructed image signal with light intensities of actual surface irradiances relating to the object; and
    using the reconstructed image signal to reconstruct the surface topography of the object.

2. The method of claim 1, wherein the forming of the safe light intensity distribution further comprises the steps of:
    providing a light source; and
    using an intensity control switch for modulating the light intensity distribution of the light source so as to form the safe light intensity distribution configured to enable the surface irradiance signal to be ranged within the dynamic range of the imaging device.

3. The method of claim 2, wherein the forming of the safe light intensity distribution further comprises the steps of:
    projecting a light with a specific intensity distribution onto a calibration object where it is reflected to form a raw surface irradiance signal;
    using the imaging device to capture the raw surface irradiance signal to be used for forming a raw image signal;
    making an evaluation to determine where there is any pixel in the raw image signal whose corresponding brightness level is out of the dynamic range of the imaging device; if so, enabling an modulation process to be performed so as to generate a calibrated surface irradiance signal configured to produce a calibrated image signal with the surface brightness levels of all its pixels to be ranged within the dynamic range of the imaging device; and
    registering the light intensity distribution resulting from the modulation process so as to form the safe light intensity distribution.

4. The method of claim 3, wherein the modulation process is performed for adjusting one signal selected from the group consisting of: the raw surface irradiance signal and the signal relating to the specific intensity distribution.

5. The method of claim 2, wherein the forming of the safe light intensity distribution further comprises the steps of:
    projecting a light with a specific intensity distribution onto the object where it is reflected to form a raw surface irradiance signal;
    using the imaging device to capture the raw surface irradiance signal to be used for forming a raw image signal;
    making an evaluation to determine where there is any pixel in the raw image signal whose corresponding brightness level is out of the dynamic range of the imaging device; if so, enabling an modulation process to be performed so as to generate a calibrated surface irradiance signal configured to produce a calibrated image signal with the surface brightness levels of all its pixels to be ranged within the dynamic range of the imaging device; and
    using the light intensity distribution resulting from the modulation process directly as the safe light intensity distribution.

6. The method of claim 5, wherein the modulation process is performed for adjusting one signal selected from the group consisting of: the raw surface irradiance signal and the signal relating to the specific intensity distribution.

7. The method of claim 1, wherein during the performing of the forming of the safe light intensity distribution, an intensity control switch is enabled for modulating the light intensity distribution of the surface irradiance signal resulting from the reflection of the object's surface so as to form the safe light intensity distribution.

8. A system for high dynamic range image measurement, comprising:
   a light source, for providing a detection light to be projected onto an object so as to form an object light;
   an imaging device, for receiving the object light to be used for forming an image signal;
   a light modulation switch, disposed between the light source and the object to be used for modulating the detection light so as to enable the same to be featured by a safe light intensity distribution and thus enable light intensities resulting from the object light that are detected by the imaging device to be ranged within the dynamic range of the imaging device, wherein the light modulation switch is a switch device configured for controlling the regional illumination of the object in a pointwise manner; and
   a control unit, coupled to the light modulation switch and the imaging device, for controlling the light modulation switch to modulate the detection light and also for compensating the image signal according to the safe light intensity distribution so as to form a reconstructed image signal with actual light intensities.

9. The system of claim 8, further comprising:
   a database, registering a plurality of light modulation configurations corresponding to a plurality of safe light intensity distributions associated with a variety of objects that are to be provided to the control unit for enabling the same to control the light modulation switch for modulating the detection light accordingly.

10. The system of claim 8, wherein the control unit is configured for dynamically determine the safe light intensity distribution according to the light intensity distribution of the object light so as to directly control the light modulation switch for modulating the detection light accordingly.

11. The system of claim 8, wherein the control unit further comprises:
   an imaging processing module, for reconstructing the surface topography of the object according to the reconstructed image signal; and
   an image modulation/intensity control unit, further comprising:
      a processor;
      an intensity configuration module, for controlling the light modulation switch to modulate the light intensity distribution of the detection light; and
      a calibration module, for compensating the image signal according to the safe light intensity distribution so as to form a reconstructed image signal with light intensities of actual surface irradiances relating to the object.

12. The system of claim 8, wherein the light modulation switch is further comprised of a plurality of switch elements, and the plural switch elements are arranged corresponding to the pixels of the imaging device in a one-to-one manner or in a one-to-many manner.

13. A system for high dynamic range image measurement, comprising:
   a light source, for providing a detection light to be projected onto a object so as to form an object light;
   an imaging device, for receiving the object light to be used for forming an image signal;
   a light modulation switch, disposed between the object and the imaging device to be used for modulating the detection light so as to enable the same to be featured by a safe light intensity distribution and thus enable light intensities resulting from the object light that are detected by the imaging device to be ranged within the dynamic range of the imaging device, wherein the light modulation switch is a switch device configured for controlling the regional illumination of the object in a pointwise manner; and
   a control unit, coupled to the light modulation switch and the imaging device, for controlling the light modulation switch to modulate the detection light and also for compensating the image signal according to the safe light intensity distribution so as to form a reconstructed image signal with actual light intensities.

14. The system of claim 13, further comprising:
   a database, for registering a plurality of light modulation configurations corresponding to a plurality of safe light intensity distributions associated with a variety of objects that are to be provided to the control unit for enabling the same to control the light modulation switch for modulating the detection light accordingly.

15. The system of claim 13, wherein the control unit is configured for dynamically determine the safe light intensity distribution according to the light intensity distribution of the object light so as to directly control the light modulation switch for modulating the detection light accordingly.

16. The system of claim 13, wherein the control unit further comprises:
   an imaging processing module, for reconstructing the surface topography of the object according to the reconstructed image signal; and
   an image modulation/intensity control unit, further comprising:
      a processor;
      an intensity configuration module, for controlling the light modulation switch to modulate the light intensity distribution of the detection light; and
      a calibration module, for compensating the image signal according to the safe light intensity distribution so as to form a reconstructed image signal with light intensities of actual surface irradiances relating to the object.

17. The system of claim 13, wherein the imaging device is integrated with the light modulation switch into an image sensing module.

18. The system of claim 13, wherein the light modulation switch is further comprised of a plurality of switch elements, and the plural switch elements are arranged corresponding to the pixels of the imaging device in a one-to-one manner or in a one-to-many manner.

* * * * *